(12) United States Patent  
Mukai et al.

(10) Patent No.: US 9,228,475 B2  
(45) Date of Patent: Jan. 5, 2016

(54) EXHAUST SILENCING DEVICE

(75) Inventors: Teruaki Mukai, Wako (JP); Jun Muto, Tochigi (JP); Yasushi Kaneko, Hamamatsu (JP)

(73) Assignees: Honda Motor Co., Ltd., Tokyo (JP); Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 14/241,512

(22) PCT Filed: Aug. 27, 2012

(86) PCT No.: PCT/JP2012/071545  
§ 371 (c)(1),  
(2), (4) Date: Feb. 27, 2014

(87) PCT Pub. No.: WO2013/035566  
PCT Pub. Date: Mar. 14, 2013

(65) Prior Publication Data  
US 2014/0291067 A1    Oct. 2, 2014

(30) Foreign Application Priority Data  
Sep. 5, 2011 (JP) .................................. 2011-193310

(51) Int. Cl.  
*F01N 1/08* (2006.01)  
*F01N 13/00* (2010.01)  
(Continued)

(52) U.S. Cl.  
CPC ................ *F01N 13/007* (2013.01); *F01N 1/08* (2013.01); *F01N 1/089* (2013.01); *F01N 3/005* (2013.01); *F01N 13/00* (2013.01); *F01N 13/02* (2013.01); *F01N 2470/14* (2013.01); *F01N 2470/20* (2013.01); *F01N 2490/06* (2013.01);  
(Continued)

(58) Field of Classification Search  
CPC ............ F01N 2470/14; F01N 2470/20; F01N 2490/06; F01N 2490/10; F01N 2490/08  
USPC ................................................ 181/239, 244  
See application file for complete search history.

(56) References Cited

U.S. PATENT DOCUMENTS 4,393,956 A * 7/1983 Tsukui et al. ................. 181/265  
5,025,890 A * 6/1991 Hisashige et al. ............ 181/272  
5,712,454 A * 1/1998 Ozawa et al. ................. 181/226  
(Continued)

FOREIGN PATENT DOCUMENTS

JP    S60-82515 U    6/1985  
JP    S62-105323 U   7/1987  
(Continued)

*Primary Examiner* — Jeremy Luks  
(74) *Attorney, Agent, or Firm* — Carrier Blackman & Associates, P.C.; Joseph P. Carrier; William D. Blackman

(57) ABSTRACT

An exhaust silencing device connected to an exhaust system of an engine is provided in which two outlet pipes that have at an upstream end thereof an opening portion opening within the silencer main body and that discharge exhaust gas within the silencer main body to an outside thereof are disposed within the silencer main body along a bottom thereof so that the distances thereof from the lowest part of the bottom are substantially equal, and the opening portion of one outlet pipe is directed further toward the bottom of the silencer main body than is the opening portion of the other outlet pipe. Such exhaust silencing device efficiently discharges to the outside the condensed water building up within the silencer main body so as not to impair an effect in reducing exhaust resistance by providing two outlet pipes that guide the exhaust gas to the outside.

1 Claim, 11 Drawing Sheets

(51) Int. Cl.
  *F01N 13/02* (2010.01)
  *F01N 3/00* (2006.01)

(52) U.S. Cl.
  CPC ......... *F01N2490/08* (2013.01); *F01N 2490/10* (2013.01); *F01N 2900/1628* (2013.01)

(56) References Cited

U.S. PATENT DOCUMENTS

| | | | |
|---|---|---|---|
| 6,571,911 | B2 | 6/2003 | Watanabe et al. |
| 7,004,283 | B2 * | 2/2006 | Worner et al. ............... 181/239 |
| 7,789,195 | B2 * | 9/2010 | Mabuchi et al. ............... 181/239 |
| 8,028,798 | B2 * | 10/2011 | Koyanagi et al. ............... 181/251 |
| 2004/0194457 | A1 * | 10/2004 | Hufendiek et al. ............. 60/324 |
| 2007/0272478 | A1 * | 11/2007 | Larrea Napal et al. ....... 181/227 |
| 2010/0146957 | A1 * | 6/2010 | Ambrosino et al. ............ 60/324 |

FOREIGN PATENT DOCUMENTS

| | | |
|---|---|---|
| JP | H01-149517 U | 10/1989 |
| JP | H03-71123 U | 7/1991 |
| JP | 2002-097922 A | 4/2002 |
| JP | 2003-239716 A | 8/2003 |

\* cited by examiner

EXHAUST SILENCING DEVICE

TECHNICAL FIELD

The present invention relates to an exhaust silencing device connected to an exhaust system of an engine for a vehicle, etc. and, in particular, to an exhaust silencing device in which an effect in reducing exhaust resistance by providing two outlet pipes within a silencer main body is not impaired by build-up of condensed water.

BACKGROUND ART

Conventionally, an arrangement in which for the purpose of increasing the flow rate of exhaust gas of a silencer and reducing the exhaust resistance, two outlet pipes (dual type) for exhaust gas to flow are provided is already known; for example, an exhaust silencing device disclosed in Patent Document 1 below includes a silencer main body (silencer), an inlet pipe (exhaust pipe) 2 that has at the downstream end an opening portion opening within the silencer main body and that guides exhaust gas from an engine to the interior of the silencer main body, and two outlet pipes, that is, a short outlet pipe (tailpipe) 11 and long outlet pipe (tailpipe) 12 that have at the upstream end an opening portion opening within the silencer main body and that discharge the exhaust gas within the silencer main body to the outside of the silencer main body, an opening portion 12a of the long outlet pipe 12 being positioned above an opening portion 11a of the short outlet pipe 11, and condensed water that builds up at the bottom of the silencer accompanying the exhaust gas being cooled is discharged outside mainly via the short outlet pipe, thereby reducing the flow of condensed water into the long outlet pipe.

In the above arrangement of Patent Document 1, if the amount of condensed water within the long outlet pipe increased, since there is a possibility that the output of the engine would decrease, the silencing effect would decrease, and the outlet pipe would be blocked due to freezing of condensed water in winter, condensed water flowing into the long outlet pipe has to be reduced.

RELATED ART DOCUMENTS

Patent Document

Patent Document 1: Japanese Utility Model Registration Publication No. 3-6808

SUMMARY OF INVENTION

Problems to be Solved by the Invention

When the length of the outlet pipe is not so long that the above possibility will arise, it is not necessary to intentionally reduce condensed water flowing into the long outlet pipe. When the purpose of providing two outlet pipes is to increase the passage cross-sectional areas of the outlet pipe to thus increase the flow rate of exhaust gas and reduce the exhaust resistance, the flow velocity of exhaust gas passing through the outlet pipe decreases due to the increased passage cross-sectional area, as a result the power of the outlet pipe to suck up condensed water decreases, and condensed water easily builds up at the bottom of the silencer; it is therefore desirable for the design to be such that condensed water is discharged as quickly as possible from the two outlet pipes.

The present invention has been accomplished in light of such circumstances, and it is an object thereof to provide a novel exhaust silencing device in which an effect in reducing exhaust resistance by providing two outlet pipes can reliably be prevented from being impaired by condensed water building up within the outlet pipes.

Means for Solving the Problems

In order to solve the above problems, according to a first aspect of the present invention, there is provided an exhaust silencing device comprising a silencer main body, an inlet pipe that has at a downstream end thereof an opening portion opening within the silencer main body and that guides exhaust gas from an engine to the silencer main body, and two outlet pipes that have at an upstream end thereof an opening portion opening within the silencer main body and that discharge exhaust gas within the silencer main body to an outside of the silencer main body, characterized in that the two outlet pipes are disposed within the silencer main body along a bottom of the silencer main body so that the distances thereof from the lowest part of the bottom are substantially equal, and the opening portion of one of the outlet pipes is directed further toward the bottom of the silencer main body than is the opening portion of the other outlet pipe.

In order to solve the above problems, according to a second aspect of the present invention, in addition to the first aspect, the silencer main body is inclined upwardly from an upstream side of the silencer main body toward a downstream side of the silencer main body in a direction of flow of exhaust gas, the opening portions of the one and other outlet pipes are on the upstream side within the silencer main body, and the opening portion of the one outlet pipe is inclined downwardly from the upstream side toward the downstream side.

In order to solve the above problems, according to a third aspect of the present invention, in addition to the first aspect, the two outlet pipes are formed into an S-shape and are disposed at opposite sides in a longitudinal direction within the silencer main body, upstream-side outlet pipes of these outlet pipes are disposed along the bottom of the silencer main body so that the distances thereof from the lowest part of the bottom are substantially equal, and the opening portions formed at the upstream end of the one and other outlet pipes are disposed in a central part in the longitudinal direction of the silencer main body.

Effects of the Invention

In accordance with the first aspect of the present invention, when the amount of condensed water building up at the bottom of the silencer main body is small, condensed water is efficiently discharged to the outside of the silencer main body via the one outlet pipe. Furthermore, when the amount of condensed water building up increases, the water level rises, and the amount of condensed water discharged from the one outlet pipe decreases, since the ability of the other outlet pipe to discharge condensed water improves outstandingly, a state in which there is a high water level is promptly eliminated. Therefore, it is possible to reliably prevent the effect in reducing exhaust resistance by providing two outlet pipes from being impaired by condensed water building up.

Furthermore, in accordance with the second aspect of the present invention, a small amount of condensed water building up at the bottom of the silencer main body is promptly collected on the upstream side of the silencer main body and quickly and efficiency discharged with little resistance via one of the outlet pipes that has its opening portion inclined downwardly from the upstream side to the downstream side.

Moreover, in accordance with the third aspect of the present invention, since condensed water building up within the silencer main body is discharged from the central part in the longitudinal direction of the silencer main body to the outside via one end or the other end in the longitudinal direction, even if the silencer main body is long and narrow, condensed water building up there can be discharged quickly, and it is possible to more reliably prevent the effect in reducing exhaust resistance by providing two outlet pipes from been impaired by condensed water building up.

EXPLANATION OF REFERENCE NUMERALS AND SYMBOLS

Figure 1:
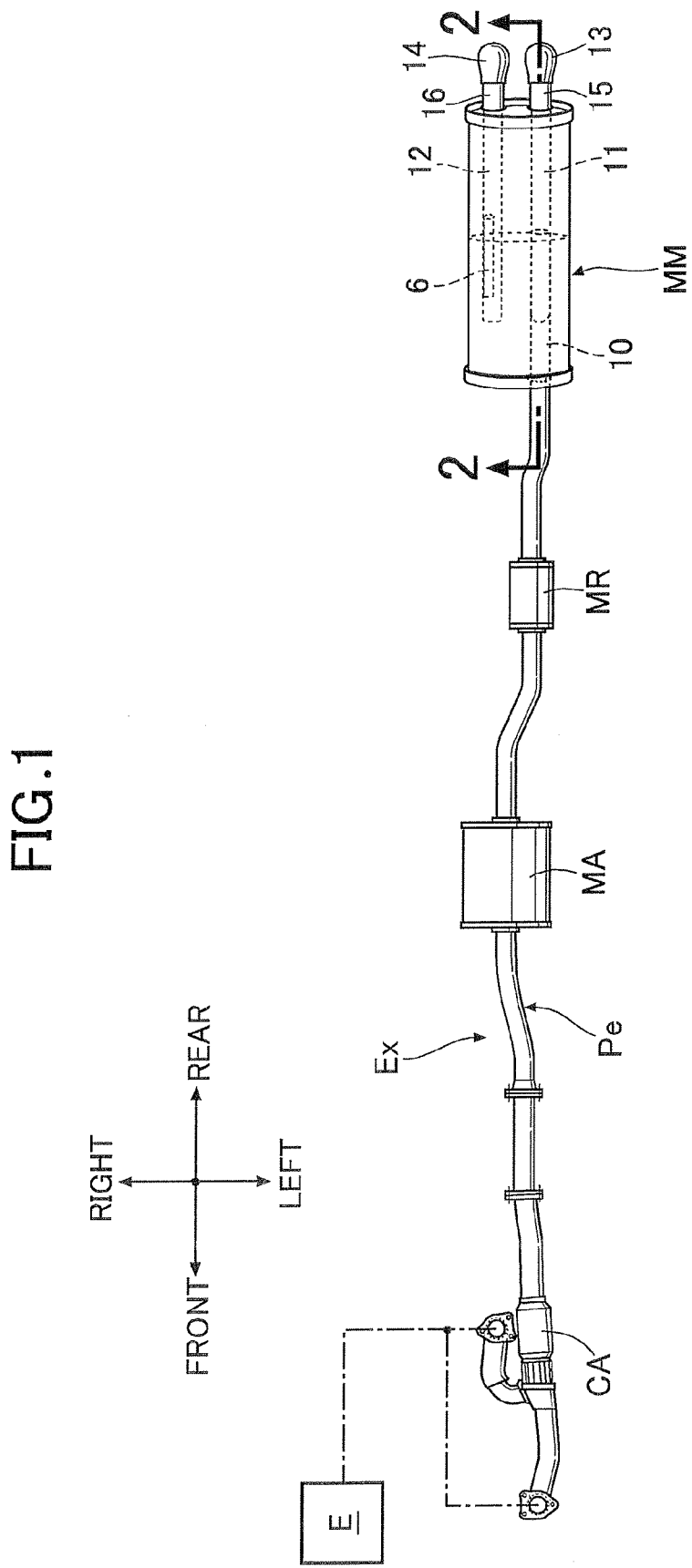
FIG. 1 is a diagram showing an exhaust system equipped with the exhaust silencing device of the present invention. (first embodiment)

1; 101 Silencer main body
10; 110 Inlet pipe
11; 111 One outlet pipe
11o; 111o Opening portion
111u Upstream-side outlet pipe
12; 112 Other outlet pipe
12o; 112o Opening portion
112u Upstream-side outlet pipe
E Engine
Modes For Carrying Out The Invention Modes for carrying out the present invention are specifically explained below by way of embodiments of the present invention shown in the attached drawings.

In first and second embodiments below, front and rear, left and right, and up and down are with respect to the direction of forward travel of an automobile equipped with an exhaust system.

Embodiment 1

A first embodiment of the present invention is now explained by reference to FIGS. 1 to 4.

This first embodiment is a case in which the exhaust silencing device of the present invention is implemented in a silencer that is mounted lengthwise (disposed in the fore-and-aft direction) in an exhaust system installed in an automobile.

In FIG. 1, an exhaust pipe Pe in an exhaust system Ex of a six-cylinder engine E for an automobile has connected in series thereto, in order from the upstream side to the downstream side, a catalyst CA, auxiliary silencers (prechambers) MA and MR, and a main silencer MM. Exhaust gas discharged from the six-cylinder engine E installed on a vehicle body of the automobile is passed through the catalyst CA to remove harmful components such as HC, CO, and NOx, then subjected to auxiliary silencing while flowing through the auxiliary silencers MA and MR, further subjected to main silencing while flowing through the main silencer MM, and discharged to the atmosphere.

The arrangement of the main silencer MM equipped with the exhaust silencing device related to the present invention is explained in detail below by reference to FIGS. 2 to 4.

This main silencer MM is mounted lengthwise (its longitudinal direction being in the fore-and-aft direction) so as to be inclined upwardly from the upstream side of the main silencer MM in the direction of flow of exhaust gas toward the downstream side of the main silencer MM. A silencer main body 1 forming its outer shell is formed from an elliptic cylinder body part 2 and front and rear end plates 3 and 4 closing front and rear open ends of the body part 2, outer peripheral edges of the front and rear end plates 3 and 4 being fixed by swaging to outer peripheral faces at front and rear ends of the body part 2 along the entire periphery. A separator 5 for partitioning expansion chambers within the silencer main body 1 in the longitudinal direction is provided in an intermediate part in the longitudinal direction of the silencer main body 1. This separator 5 is provided with a communication pipe 6, which provides communication between front and rear expansion chambers partitioned by the separator 5. Furthermore, a water through hole h opens at the lower end of the separator 5.

Supported in an upper part of a front half of the silencer main body 1 is an inlet pipe 10 extending through the expansion chamber in the longitudinal direction. The front end (the upstream end) of this inlet pipe 10 is supported on the front end plate 3 so as to extend therethrough, communicates with the exhaust pipe Pe, and is welded to the front end plate 3 together with the exhaust pipe Pe. The downstream end (rear end) of the inlet pipe 10 extends through the separator 5 and is welded thereto, and its downstream end opens in the interior of the expansion chamber. This inlet pipe 10 guides exhaust gas from the engine E to the expansion chamber within the silencer main body 1.

Furthermore, arranged side by side in the left-and-right direction within the silencer main body 1 are two outlet pipes, that is, one outlet pipe 11 and another outlet pipe 12, extending in the longitudinal direction in the interior of the expansion chamber. The one and other outlet pipes 11 and 12 have their intermediate parts supported on the separator 5 so as to extend therethrough and their downstream ends (rear ends) connected, via connecting pipes 15 and 16, to tailpipes 13 and 14 extending through the rear end plate 4 and opening to the outside.

The upstream ends (front ends) of the one and other outlet pipes 11 and 12 have opening portions 11o and 12o opening in a front part of the interior of the expansion chamber of the silencer main body 1 and guide to the outside exhaust gas that has flowed into the silencer main body 1 and has been silenced by the expansion chamber.

Figure 2:
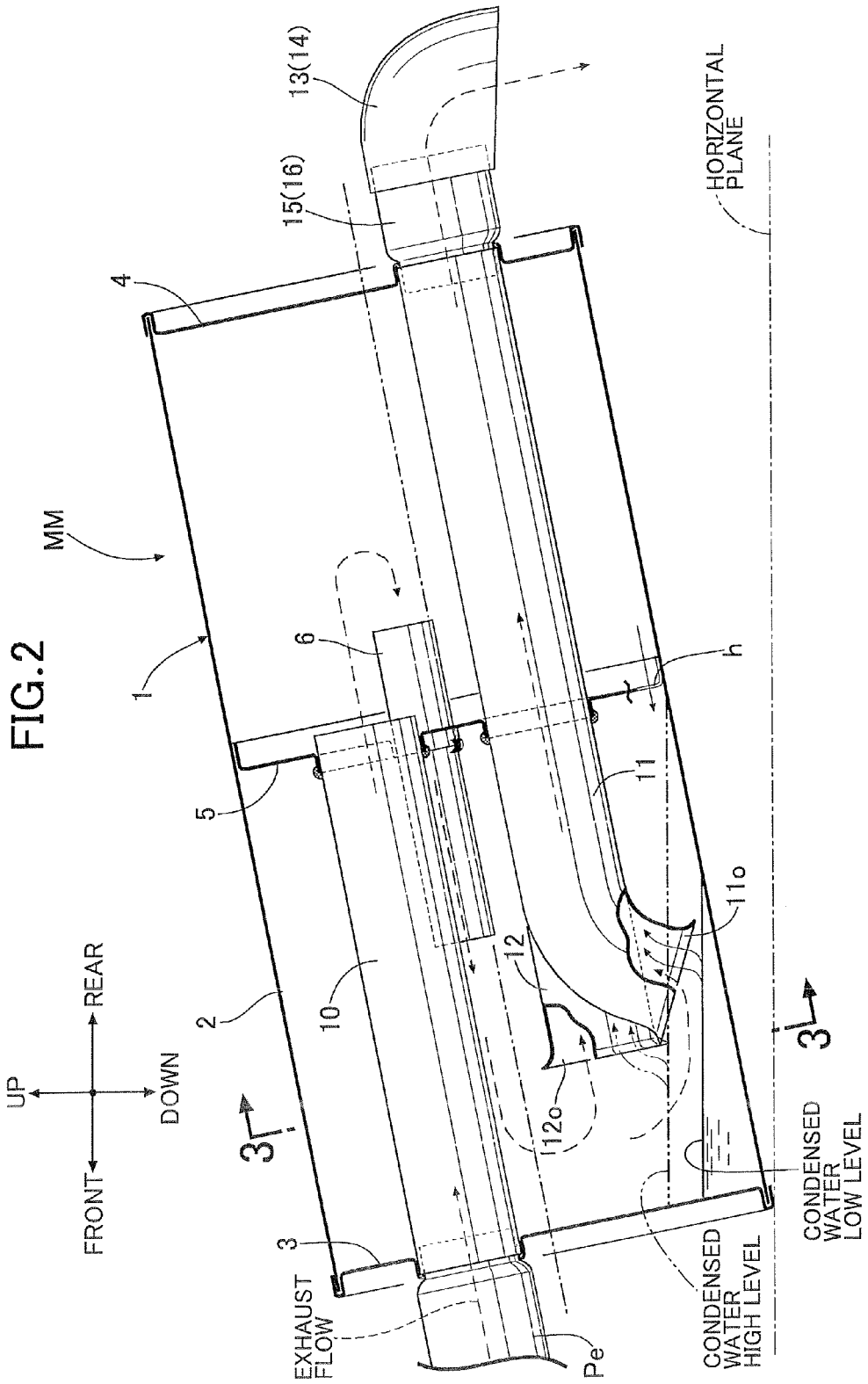
FIG. 2 is an enlarged sectional view along line 2-2 in FIG. 1. (first embodiment)
Figure 3:
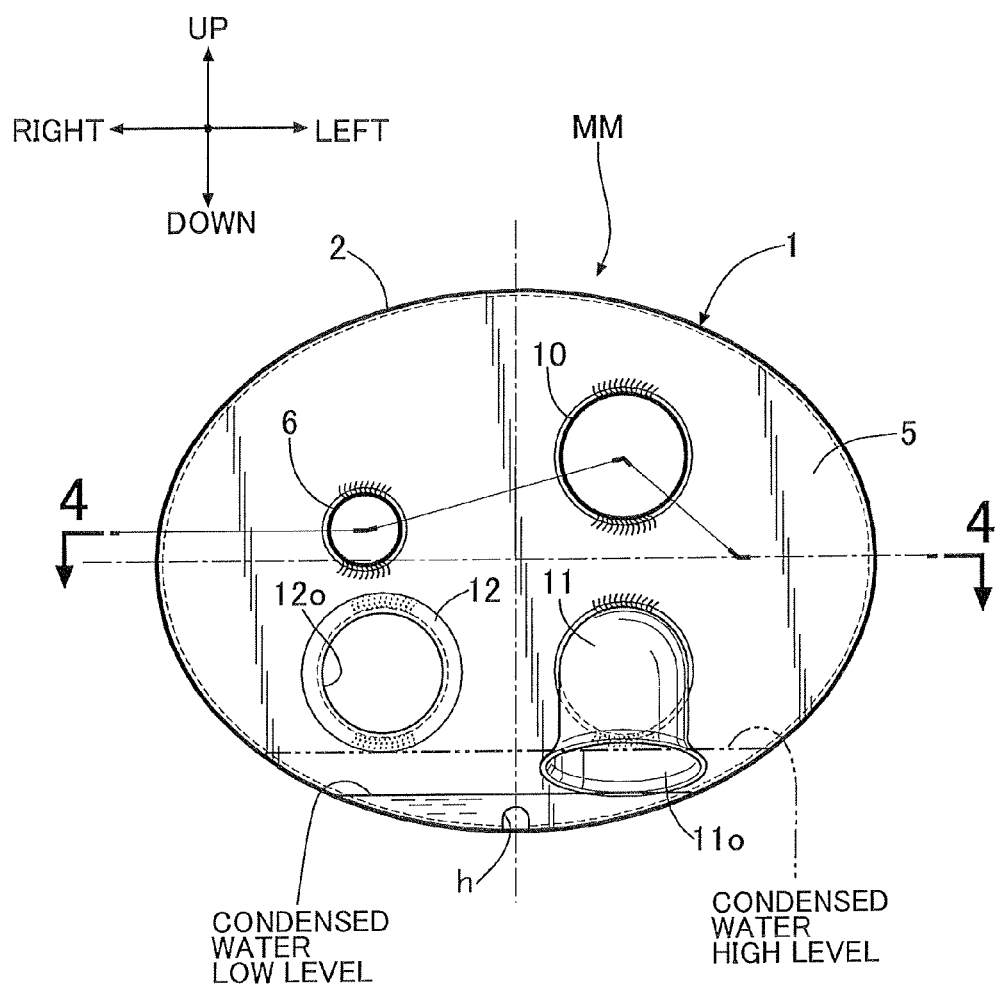
FIG. 3 is a sectional view along line 3-3 in FIG. 2. (first embodiment)
Figure 4:
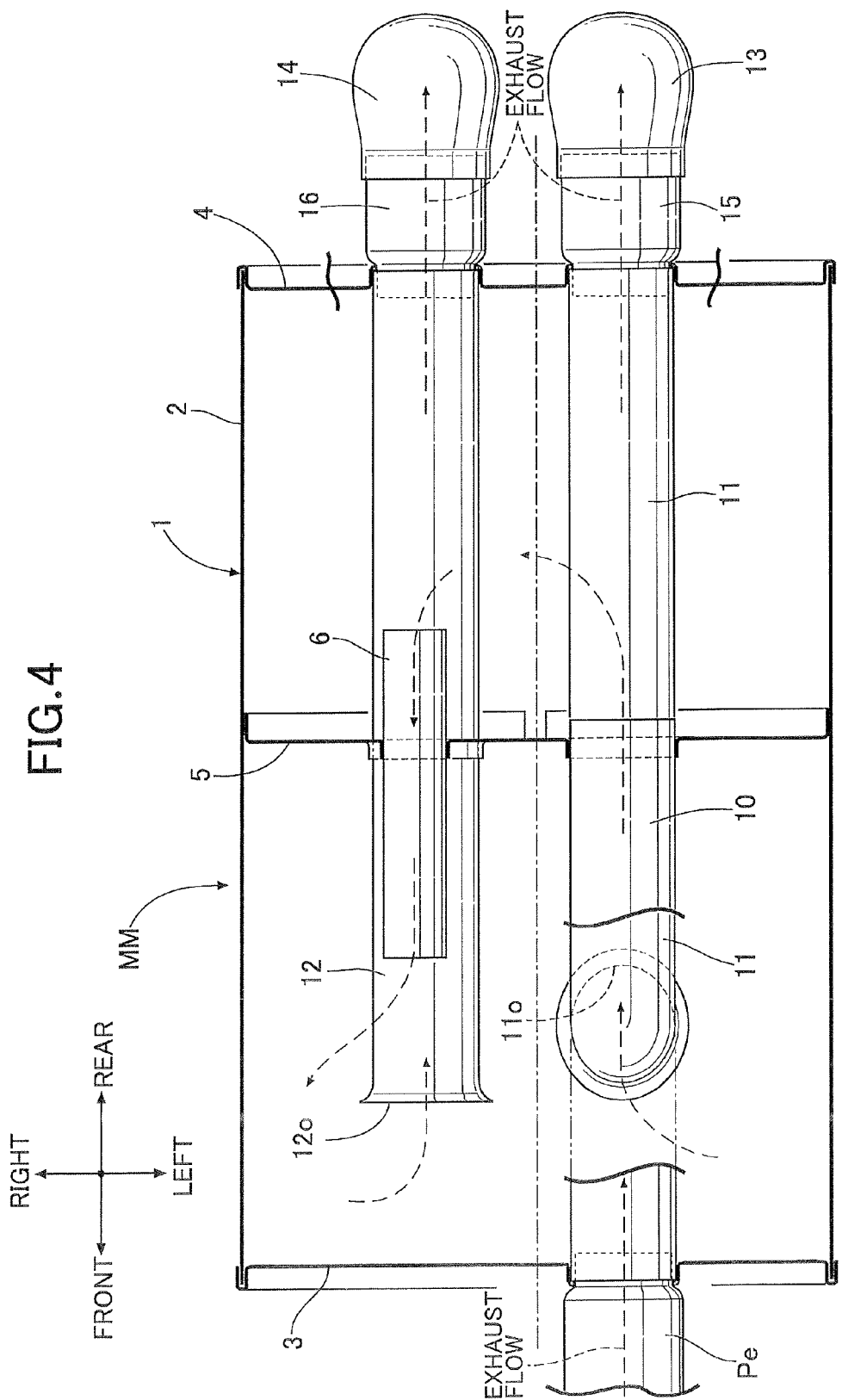
FIG. 4 is a sectional view along line 4-4 in FIG. 3. (first embodiment)

As shown in FIGS. 2 and 3, the one and other outlet pipes 11 and 12 are disposed along the bottom of the silencer main body 1 within the silencer main body 1 so that the distances thereof from the lowest part of the bottom are substantially equal. The upstream end (front end) of the one outlet pipe 11 is downwardly curved, its opening portion 11o is inclined downwardly from the upstream side of the silencer main body 1 toward the downstream side (from the front side to the rear side) and is directed more toward the bottom of the silencer main body 1 than is the opening portion 12o of the other outlet pipe 12. The opening portion 12o of the other outlet pipe 12 is directed in the longitudinal direction of the silencer main body 1 (direction substantially parallel to the bottom of the silencer main body 1).

The operation of the first embodiment is now explained.

Exhaust gas generated by operation of the engine E is guided from the exhaust pipe Pe to the expansion chamber through the inlet pipe 10. Exhaust gas that has flowed into the expansion chamber flows in an indirect route from the rear part of the expansion chamber to the front part of the expansion chamber via the communication pipe 6 while being silenced. The silenced exhaust gas within the expansion chamber is divided into two, that is, into the one and other outlet pipes 11 and 12, via the opening portions 11o and 12o of the pipes 11 and 12 and discharged to the outside via the tailpipes 13 and 14. The flow resistance of the exhaust gas is reduced due to the exhaust gas being divided and flowing through the one and other outlet pipes 11 and 12.

When the operation of the engine E is stopped and the main silencer MM is cooled, high temperature exhaust gas flowing there is also cooled; moisture contained in the exhaust gas condenses and, as shown in FIGS. 2 and 3, becomes condensed water that builds up within the silencer main body 1.

The exhaust silencing device of the first embodiment discharges the condensed water to the outside via the following process.

[When Condensed Water is at Low Level]

As shown by the solid lines in FIGS. 2 and 3, when the amount of condensed water building up at the bottom of the silencer main body 1 is small and the water level thereof is low, since the opening portion 11o of the one outlet pipe 11 is directed toward the bottom of the silencer main body 1, the condensed water is efficiently sucked up through the opening portion 11o of the one outlet pipe 11 and discharged to the outside of the silencer main body 1 through the outlet pipe 11.

Furthermore, as shown in FIG. 2, the silencer main body 1 is inclined upwardly from the upstream side (exhaust pipe Pe side) of the silencer main body 1 toward the downstream side (tailpipes 13 and 14 side) of the silencer main body 1 in the direction of flow of the exhaust gas, a small amount of condensed water collects on the upstream side (front part) of the silencer main body 1, the upstream ends of the one and other outlet pipes 11 and 12 are on the upstream side (front part) of the silencer main body 1, the upstream end of the one outlet pipe 11 is downwardly curved, and its opening portion 11o is inclined downwardly from the upstream side of the silencer main body 1 toward the downstream side of the silencer main body 1 in the direction of flow of exhaust gas, therefore making it possible to promptly and efficiency discharge condensed water collected at the bottom on the upstream side (front part) of the silencer main body 1 through the one outlet pipe 11.

[When Condensed Water is at High Level]

When the amount of condensed water building up increases and the water level of condensed water increases from the above state as shown by the double dotted broken lines in FIGS. 2 and 3, since the opening portion 11o of the one outlet pipe 11 is directed toward the bottom of the silencer main body 1, the actual opening area of the opening portion 11o into which exhaust gas flows decreases greatly due to the increase in the water level, the amount of exhaust gas flowing through the one outlet pipe 11 decreases, and the amount of condensed water discharged from the one outlet pipe 11 also decreases accompanying this. In this process, since the extent to which the opening portion 12o of the other outlet pipe 12 is directed toward the bottom of the silencer main body 1 is small or none, the actual opening area of the opening portion 12o into which exhaust gas flows does not decrease a lot even when the water level of condensed water increases, the amount of exhaust gas flowing through the other outlet pipe 12 increases by an amount corresponding to the decrease in the amount of exhaust gas flowing through the one outlet pipe 11, and the flow velocity of the exhaust gas flowing through the other outlet pipe 12 increases. This enhances the suction power of the other outlet pipe 12 to suck up condensed water, a large amount of condensed water is sucked into the other outlet pipe 12 and discharged to the outside of the silencer main body 1, and the water level of condensed water building up at the bottom of the silencer main body 1 decreases again to the above low level.

Embodiment 2

A second embodiment of the present invention is now explained by reference to FIGS. 5 to 11.

This second embodiment is a case in which the exhaust silencing device of the present invention is implemented in a main silencer MM that is horizontally transversely mounted (horizontally disposed in the left-and-right direction) in an exhaust system Ex installed in an automobile.

Figure 5:
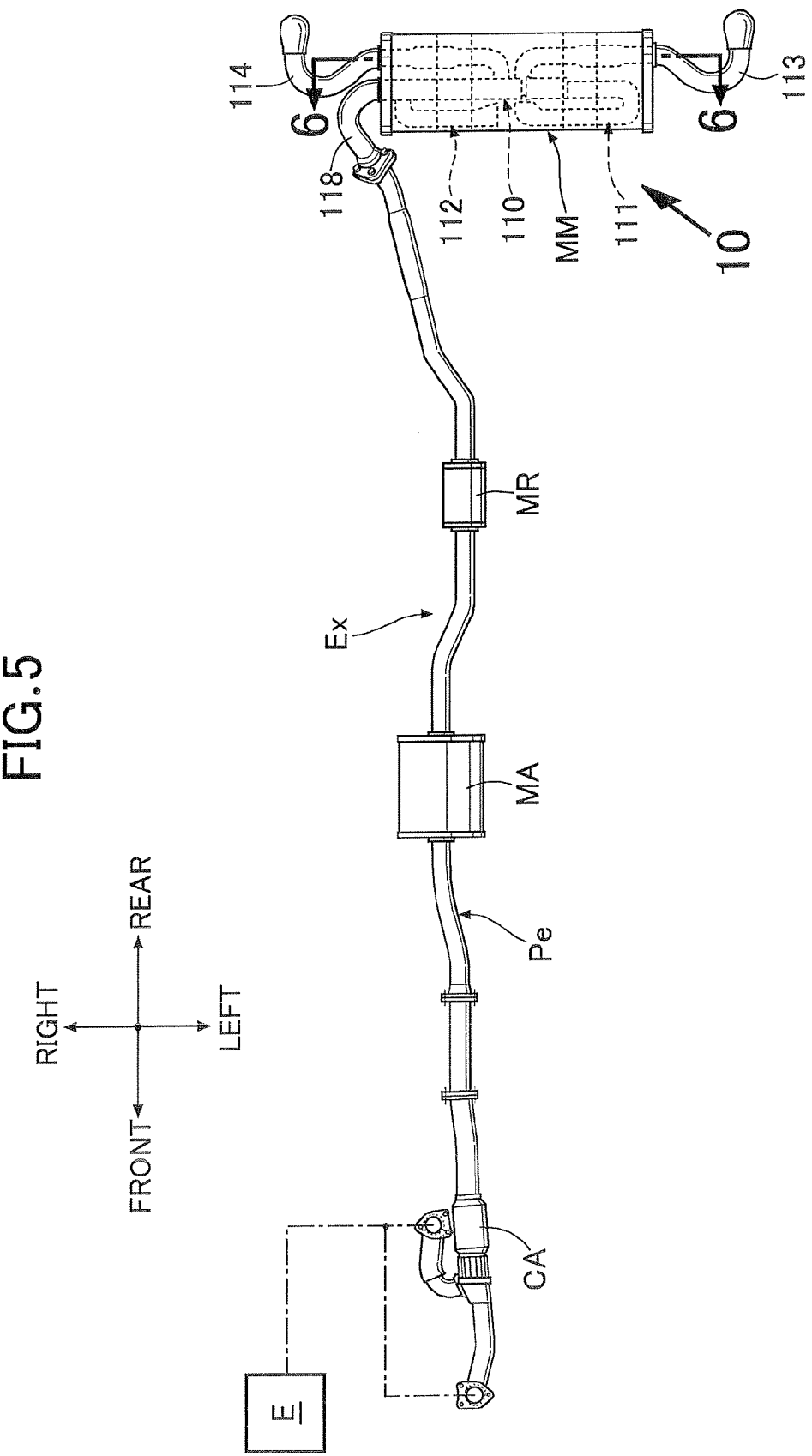
FIG. 5 is a diagram showing an exhaust system equipped with the exhaust silencing device of the present invention. (second embodiment)

In FIG. 5, an exhaust pipe Pe in the exhaust system Ex of a six-cylinder engine E for an automobile has connected in series thereto, in order from the upstream side to the downstream side, a catalyst CA, auxiliary silencers (prechambers) MA and MR, and a main silencer MM. Exhaust gas discharged from the six-cylinder engine E installed on a vehicle body of the automobile is passed through the catalyst CA to remove harmful components such as HC, CO, and NOx, then subjected to auxiliary silencing while flowing through the auxiliary silencers MA and MR, further subjected to main silencing while flowing through the main silencer MM, and discharged to the atmosphere.

The arrangement of the main silencer MM equipped with the exhaust silencing device related to the present invention is explained in detail below by reference to FIGS. 6 to 11.

Figure 8:
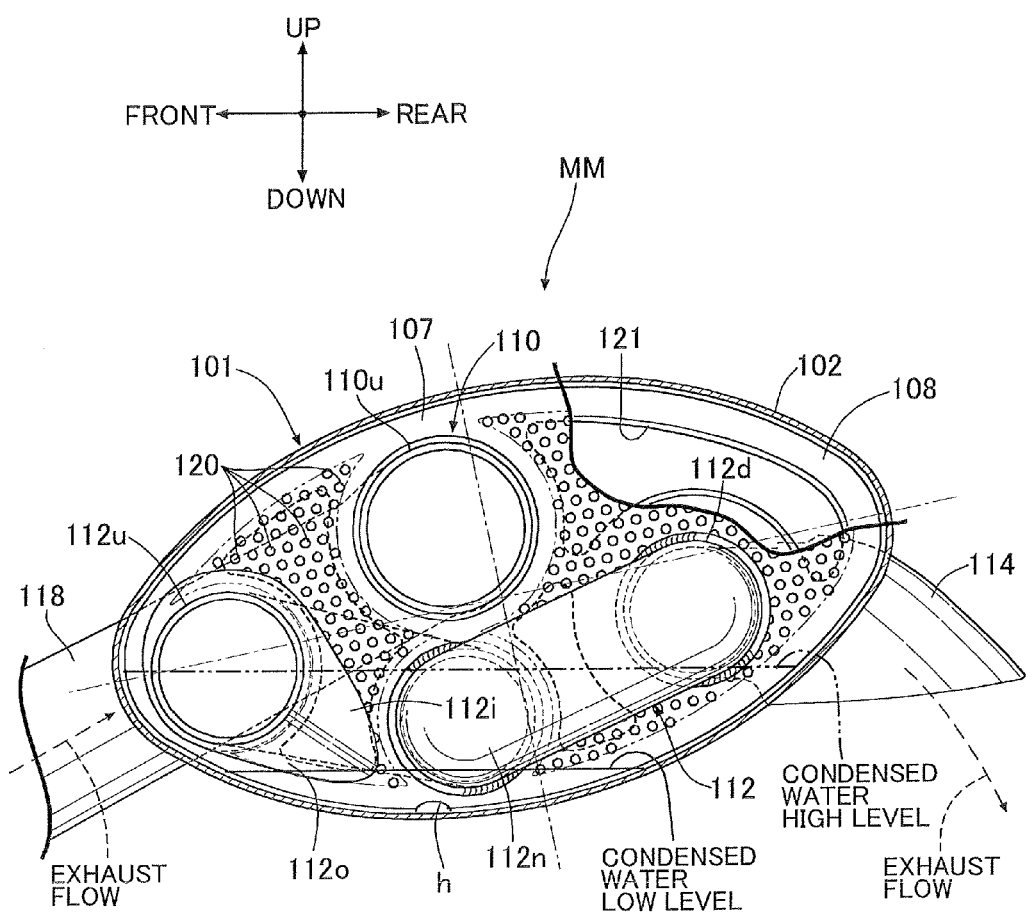
FIG. 8 is an enlarged sectional view along line 8-8 in FIG. 6. (second embodiment)
Figure 9:
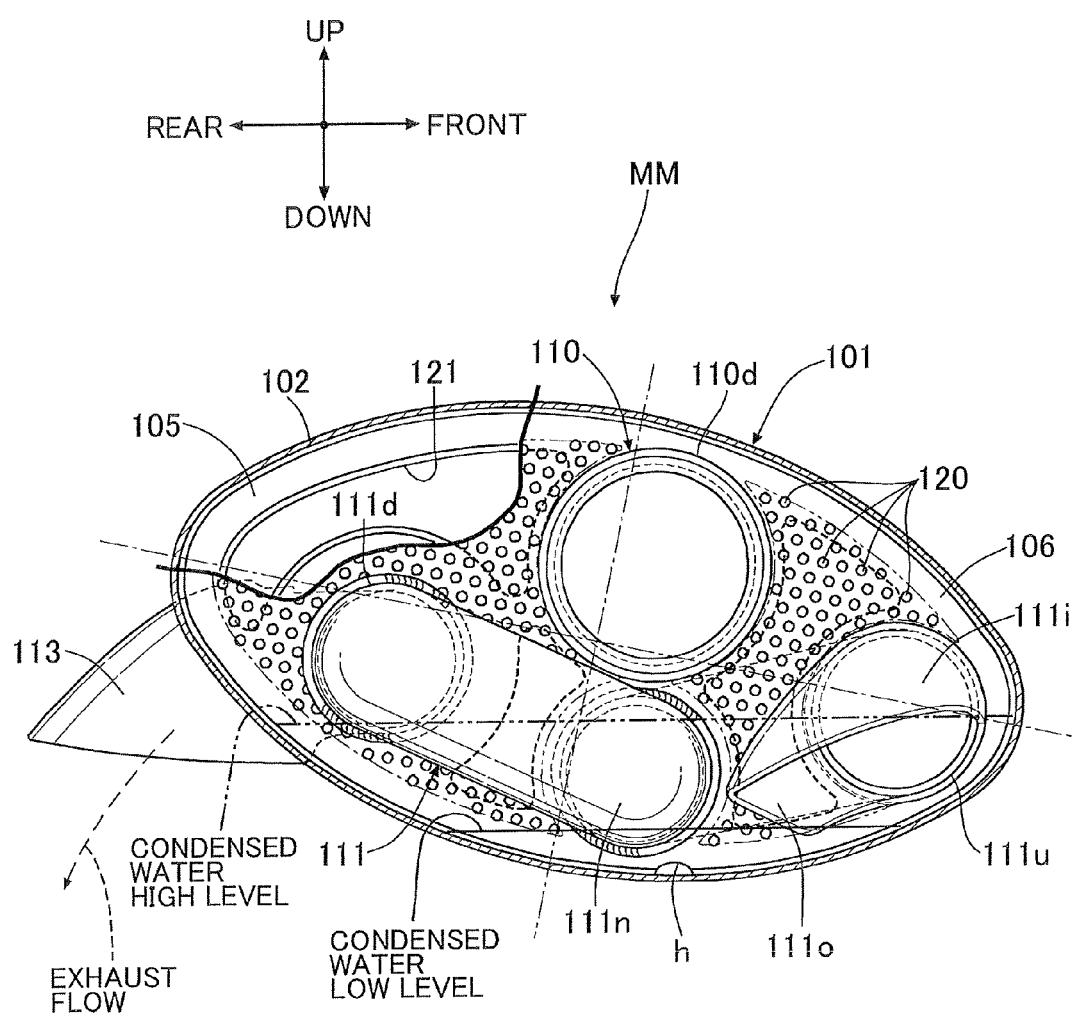
FIG. 9 is an enlarged sectional view along line 9-9 in FIG. 6. (second embodiment)

This main silencer MM is disposed so as to be substantially horizontal in the left-and-right direction (longitudinal direction) and inclined slightly downwardly to the front in the fore-and-aft direction (width direction) (see FIGS. 8 and 9). Therefore, condensed water, described later, that builds up within the main silencer MM is collected toward the front in the fore-and-aft direction.

A silencer main body 101 forming the outer shell of the main silencer MM is formed from an elliptical body part 102 and left and right end plates 103 and 104 that close left and right open ends of the body part 102. Outer peripheral edges of the left and right end plates 103 and 104 are fixed by swaging to outer peripheral faces of the left and right ends of the body part 102 along the entire periphery. Expansion chambers formed within the silencer main body 101 are partitioned in the longitudinal direction by means of four separators 105, 106, 107, and 108, and among them the two separators 106 and 107 close to the middle of the silencer main body 101 are provided with a large number of small holes (punched holes) 120 in order to reduce the sound of the flow of exhaust gas. The two separators 105 and 108 close to the outside are provided with large holes 121 in order to ease the flow of exhaust gas (see FIG. 10). In this way, the expansion chambers are provided with the separators 105 to 108, but since exhaust gas flows through the large number of small holes 120 provided in the separators 106 and 107 and the large holes 121 provided in the separators 105 and 108, the expansion chambers within the silencer main body 101 function as substantially one expansion chamber. Furthermore, a water through hole h is opened in each of the lower ends of the plurality of separators 105, 106, 107, and 108.

An exhaust gas introduction pipe 118 connect to the exhaust pipe Pe communicating with the engine E extends through the right end plate 104 from one end in the longitudinal direction of the silencer main body 101, and the downstream end thereof is supported on the right end plate 104 and communicatingly connected to an inlet pipe 110 within the expansion chamber.

The inlet pipe 110, which extends in the longitudinal direction within the expansion chamber, is formed into a straight line from an upstream-side inlet pipe 110u and downstream-side inlet pipe 110d that are communicatingly connected to each other across a slight gap d in an intermediate part thereof. The upstream-side inlet pipe 110u is supported on the separators 107 and 108 so as to extend therethrough and has in its upstream part a large number of small holes (punched holes) 122 opening between the right end plate 104 and the separator 108. Furthermore, the downstream-side inlet pipe 110d is supported on the separators 105 and 106 so as to extend therethrough and has its downstream end opening within the expansion chamber between the separator 105 and the left end plate 103. The inlet pipe 110 discharges exhaust gas into the expansion chamber via opposite end parts in the longitudinal direction of the expansion chamber, and exhaust gas that has been discharged into the expansion chamber via the opposite end parts is subjected to a reduction in the sound of the exhaust by expansion within the expansion chamber.

Two outlet pipes, that is, one outlet pipe 111 and another outlet pipe 112, are disposed symmetrically at opposite ends in the longitudinal direction within the expansion chamber of the silencer main body 101, the one and other outlet pipes 111 and 112 being bent into an S-shape in the longitudinal direction of the expansion chamber.

The one outlet pipe 111 is supported on the separators 105 and 106 so as to extend therethrough and is formed from a straight upstream-side outlet pipe 111u extending in the longitudinal direction in a front part (lower than rear part) in the fore-and-aft direction of the silencer main body 101, a straight downstream-side outlet pipe 111d extending in the longitudinal direction in a rear part in the fore-and-aft direction of the silencer main body 1, and an S-shaped intermediate-side outlet pipe 111n providing communication between the upstream-side and downstream-side outlet pipes 111u and 111d. The upstream end of the upstream-side outlet pipe 111u is in a central part in the longitudinal direction of the expansion chamber, and a beak-shaped inlet pipe 111i is connected thereto, the beak-shaped inlet pipe 111i having an opening portion 111o directed toward the bottom of the silencer main body 101.

The other outlet pipe 112 is supported on the separators 107 and 108 so as to extend therethrough, and is formed from a straight upstream-side outlet pipe 112u extending in the longitudinal direction in a front part (lower than rear part) in the fore-and-aft direction of the silencer main body 101, a straight downstream-side outlet pipe 112d extending in the longitudinal direction in a rear part in the fore-and-aft direction of the silencer main body 1, and an S-shaped intermediate-side outlet pipe 112n providing communication between the upstream-side and downstream-side outlet pipes 112u and 112d. The upstream end of the upstream-side outlet pipe 112u is in a central part in the longitudinal direction of the expansion chamber, and a trumpet-shaped inlet pipe 112i is connected thereto, the trumpet-shaped inlet pipe 112i having an opening portion 112o directed in the longitudinal direction of the silencer main body 101 (a direction substantially parallel to the bottom of the silencer main body 101).

As shown in FIGS. 7 to 11, the upstream-side outlet pipe 111u of the one outlet pipe 111 and the upstream-side outlet pipe 112u of the other outlet pipe 112 are disposed along the bottom within the silencer main body 101 so that the distances thereof from the lowest part of the bottom are substantially equal, the inlet pipe 111i of the one outlet pipe 111 and the inlet pipe 112i of the other outlet pipe 112u oppose each other across a predetermined gap, and the opening portion 111o of the one inlet pipe 111i is directed more toward the bottom side than is the opening portion 112o of the other inlet pipe 112i.

Figure 6:
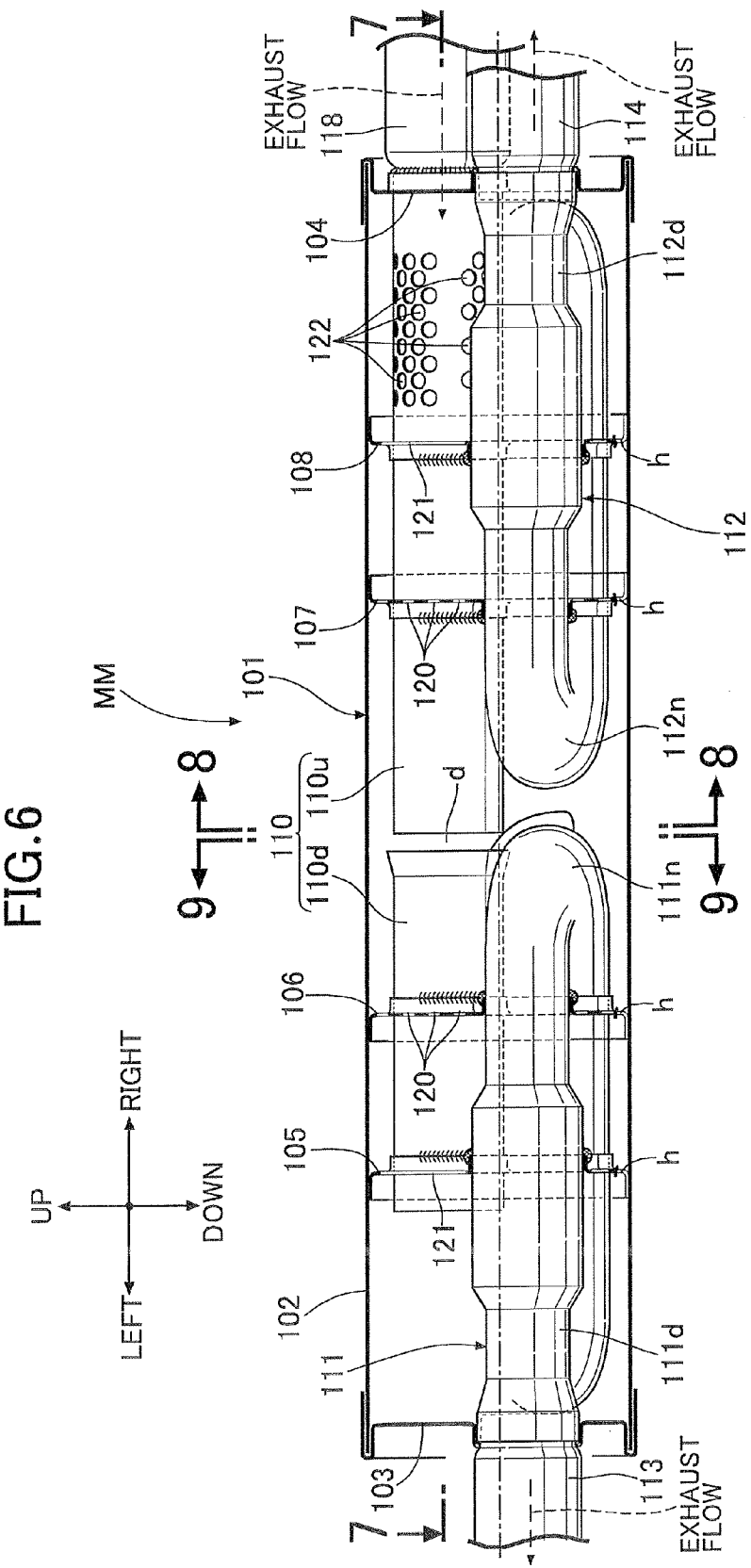
FIG. 6 is an enlarged sectional view along line 6-6 in FIG. 5. (second embodiment)
Figure 7:
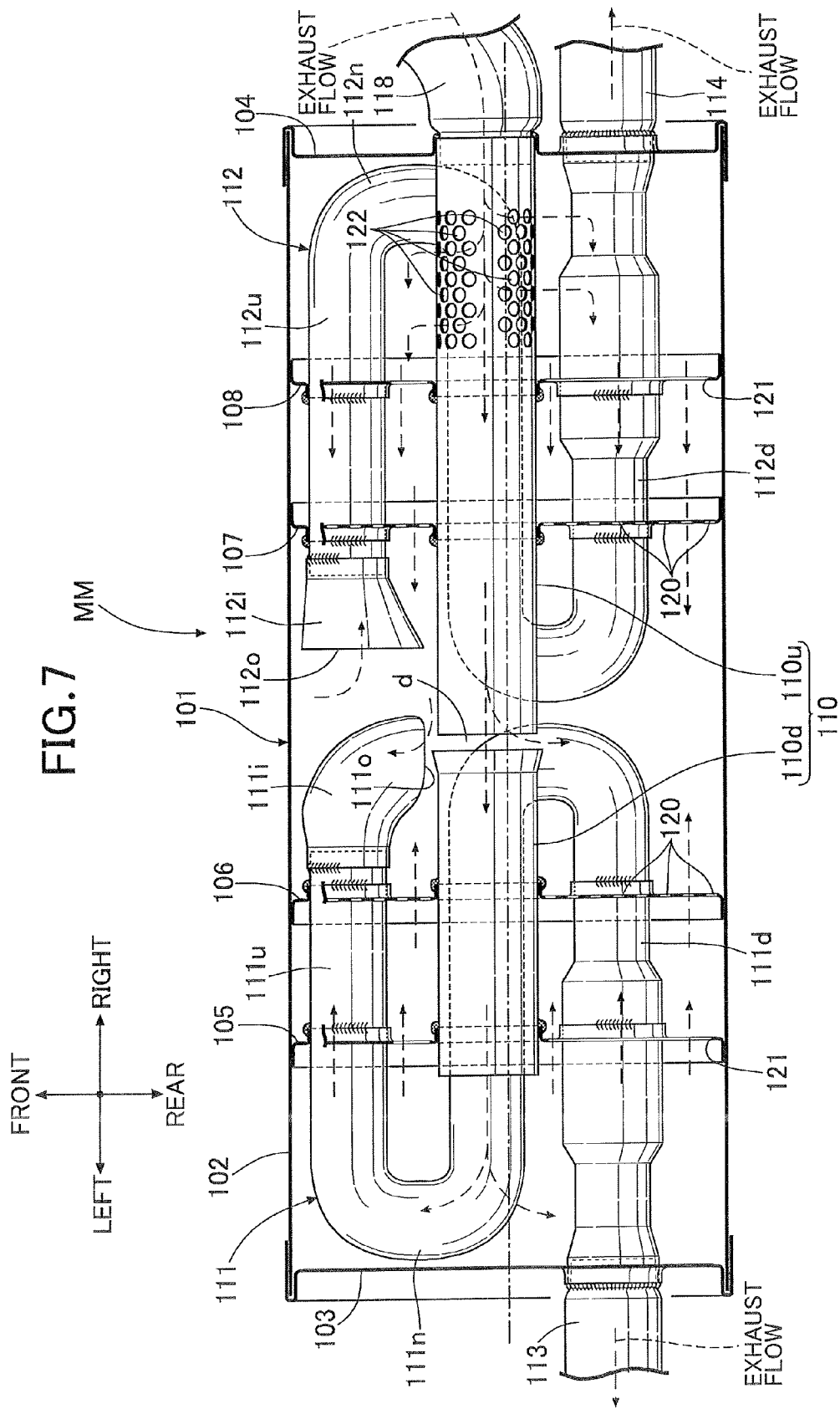
FIG. 7 is a sectional view along line 7-7 in FIG. 6. (second embodiment)
Figure 10:
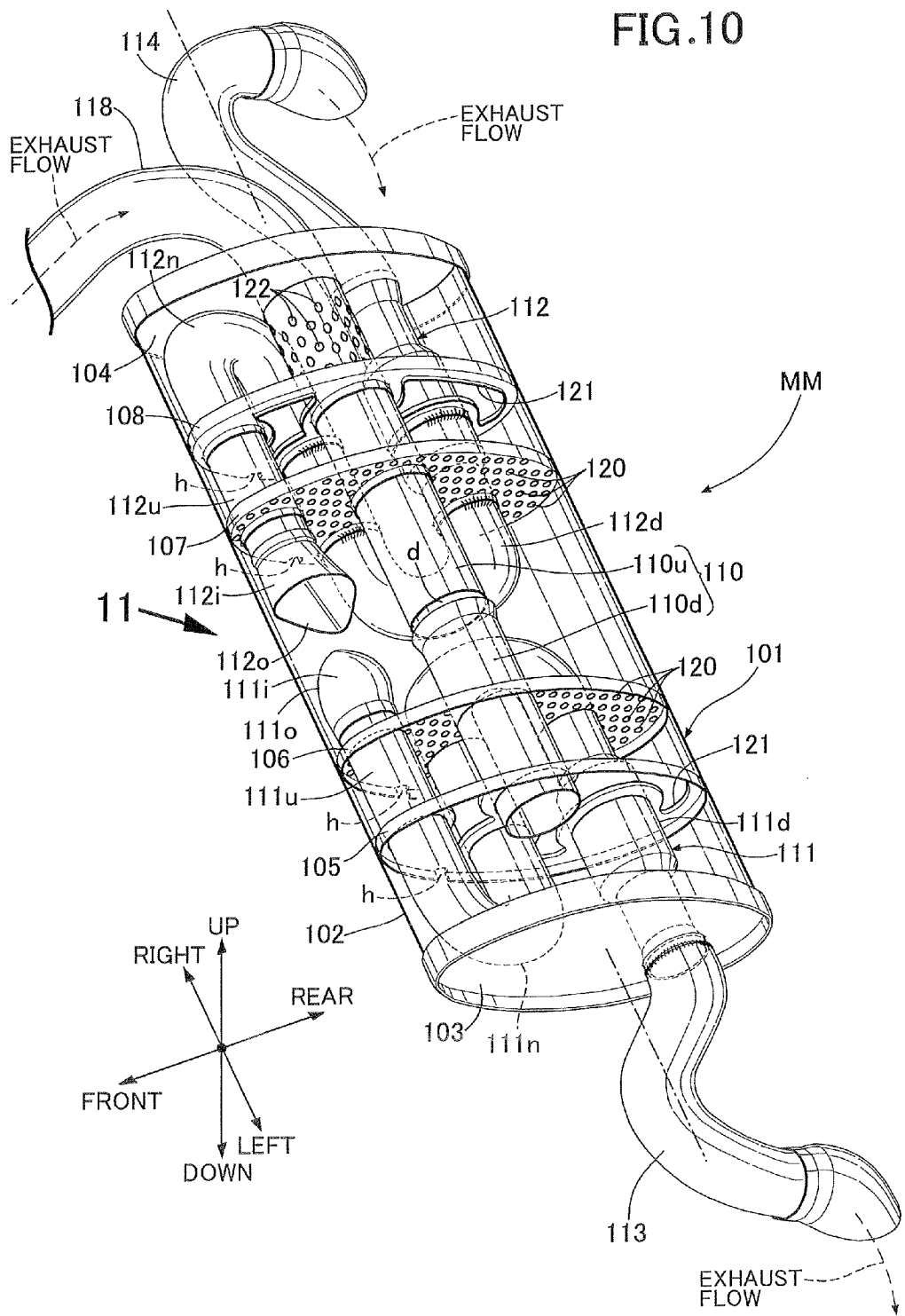
FIG. 10 is a transparent view from arrow 10 in FIG. 5. (second embodiment)

As shown in FIGS. 6, 7, and 10, the downstream end of one outlet pipe 111 is supported on the left end plate 103 so as to extend therethrough and is connected to the one tailpipe 113, and the downstream end of the other outlet pipe 112 is supported on the right end plate 104 so as to extend therethrough and is connected to another tailpipe 114. Exhaust gas within the expansion chamber is silenced in the interior of the expansion chamber and then discharged to the outside from its central part through the one outlet pipe 111 and the one tailpipe 113, and the other outlet pipe 112 and the other tailpipe 114.

The operation of the second embodiment is now explained.

Exhaust gas generated by operation of the engine E flows into the inlet pipe 110 within the silencer main body 101 from the right-hand side in the longitudinal direction of the silencer main body 101 through the exhaust introduction pipe 118 via the exhaust pipe Pe. The inlet pipe 110 extending in the longitudinal direction within the expansion chamber discharges exhaust gas into the expansion chamber via the large number of small holes (punched holes) 122 in its upstream part and the opening at the downstream end. Exhaust gas that has been discharged into the opposite end parts, in the longitudinal direction, of the expansion chamber from the inlet pipe 110 is subjected to a reduction in exhaust sound by expansion in the interior of the expansion chamber and then discharged to the outside of the silencer main body 101 via two, that is, the one and other outlet pipes 111 and 112 in the central part of the expansion chamber, and the two tailpipes 113 and 114. In this way, exhaust gas enters the expansion chamber from the opposite end parts, in the longitudinal direction, of the expansion chamber and is discharged to the outside from the central part of the expansion chamber, and even with a long narrow expansion chamber the exhaust sound can be reduced using the entire expansion chamber.

Figure 11:
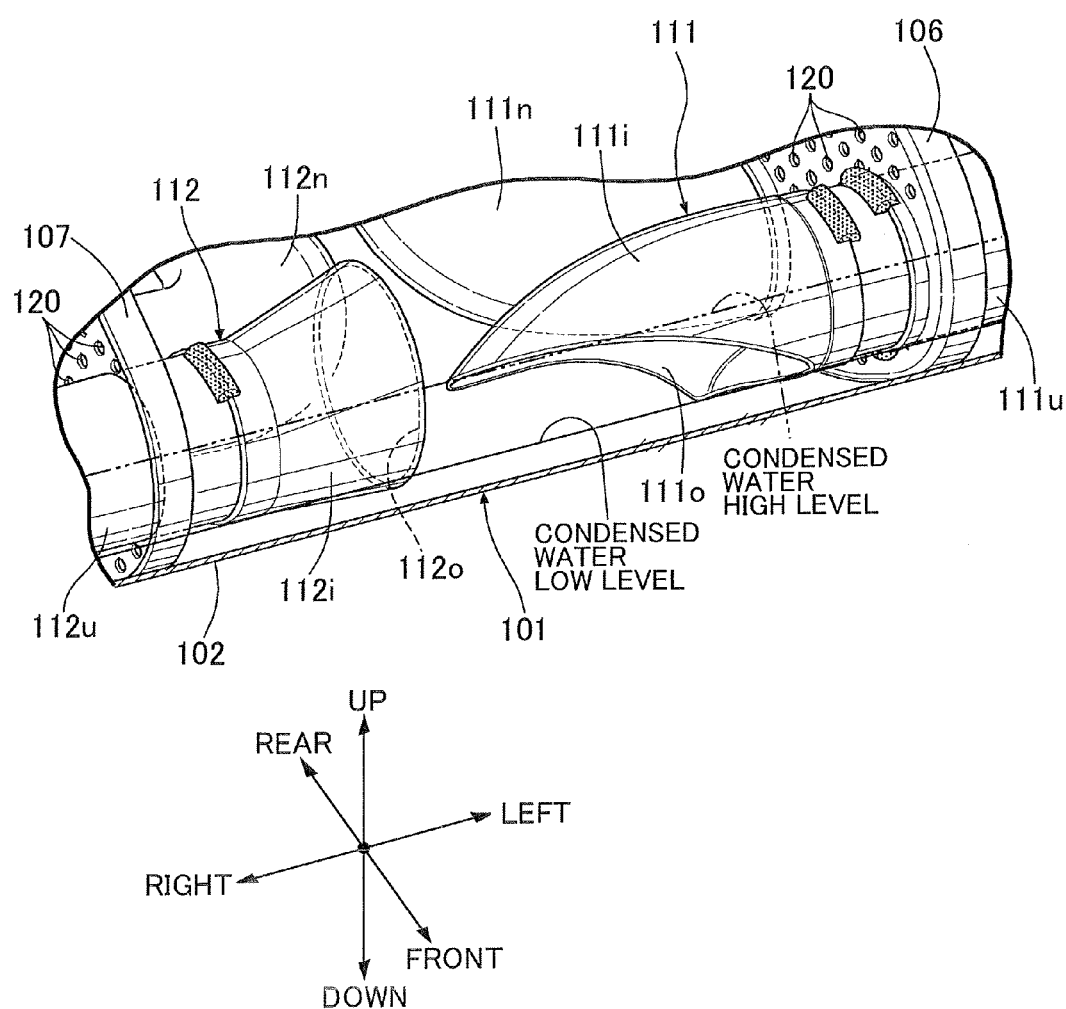
FIG. 11 is an enlarged partial view from arrow 11 in FIG. 10. (second embodiment)

When the operation of the engine E is stopped and the main silencer MM is cooled, high temperature exhaust gas flowing there is also cooled; moisture contained in the exhaust gas condenses and, as shown in FIGS. 8, 9, and 11, becomes condensed water that builds up within the silencer main body 101.

The exhaust silencing device of the second embodiment discharges the condensed water to the outside via the following process.

[When Condensed Water is at Low Level]

As shown by the solid lines in FIGS. 8, 9, and 11, when the amount of condensed water building up at the bottom of the silencer main body 101 is small and the water level thereof is low, since the opening portion 111o of the inlet pipe 111i of the one outlet pipe 111 is directed toward the bottom of the silencer main body 1, the condensed water is efficiently sucked up through the opening portion 111o of the one outlet pipe 111 and discharged to the outside of the silencer main body 1 through the outlet pipe 111.

[When Condensed Water is at High Level]

When the amount of condensed water building up increases and the water level of the condensed water increases from the above state as shown by the double dotted broken lines in FIGS. 8, 9, and 11, since the opening portion 111*o* of the inlet pipe 111*i* of the one outlet pipe 111 is directed toward the bottom of the silencer main body 1, the actual opening area of the opening portion 111*o* into which exhaust gas flows greatly decreases due to the increase in the water level, the amount of exhaust gas flowing through the one outlet pipe 111 decreases, and the amount of condensed water discharged from the one outlet pipe 111 also decreases accompanying this. In this process, since the extent to which the opening portion 112*o* of the inlet pipe 112*i* of the other outlet pipe 112 is directed toward the bottom of the silencer main body 1 is small or none, the actual opening area of the opening portion 112*o* into which exhaust gas flows does not decrease a lot even when the water level of condensed water increases, the amount of exhaust gas flowing through the other outlet pipe 112 increases by an amount corresponding to the amount by which the exhaust gas flowing through the one outlet pipe 111 has decreased, and the flow velocity of the exhaust gas flowing through the other outlet pipe 112 increases. This enhances the suction power of the other outlet pipe 112 to suck up condensed water, a large amount of condensed water is sucked into the other outlet pipe 112 and discharged to the outside of the silencer main body 101, and the water level of the condensed water building up at the bottom of the silencer main body 101 decreases again to the above low level.

Furthermore, since condensed water building up within the silencer main body 101 is discharged to the outside from the central part in the longitudinal direction of the silencer main body 101 via one end or the other end in the longitudinal direction, even with the long narrow silencer main body 101 it is possible to promptly discharge condensed water building up there, and it is possible to yet more reliably prevent the effect in reducing exhaust resistance by providing the two outlet pipes 111 and 112 from being impaired by condensed water building up.

Embodiments of the present invention are explained above, but the present invention is not limited to the embodiments and may be modified in a variety of ways within the scope of the present invention.

For example, in the embodiment the exhaust silencing device related to the present invention is implemented as the main silencer MM, but this may be implemented as another silencer.

The invention claimed is:

1. An exhaust silencing device comprising:
   a silencer main body,
   an inlet pipe that has at a downstream end thereof an opening portion opening within the silencer main body and that guides exhaust gas from an engine to the silencer main body , and
   two outlet pipes that have at an upstream end thereof an opening portion opening within the silencer main body and that discharge exhaust gas within the silencer main body to an outside of the silencer main body
   wherein the two outlet pipes are disposed within the silencer main body along a bottom of the silencer main body so that the distances thereof from the lowest part of said bottom are substantially equal,
   the opening portion of one of the outlet pipes is directed further toward the bottom of the silencer main body than is the opening portion of the other outlet pipe (12; 112),
   the silencer main body is inclined upwardly from an upstream side of the silencer main body toward a downstream side of the silencer main body in a direction of flow of exhaust gas,
   the opening portions of said outlet pipes are on the upstream side within the silencer main body,
   the opening portion of said one outlet pipe is inclined downwardly from the upstream side toward the downstream side,
   the two outlet pipes are formed into an S-shape and are disposed at opposite sides in a longitudinal direction within the silencer main body,
   upstream-side outlet pipes of said outlet pipes are disposed along the bottom of the silencer main body so that the distances thereof from the lowest part of said bottom are substantially equal, and
   the opening portions formed at the upstream end of said one and other outlet pipes are disposed in a central part in the longitudinal direction of the silencer main body.

\* \* \* \* \*